(12) United States Patent
Taveau et al.

(10) Patent No.: US 10,748,144 B2
(45) Date of Patent: *Aug. 18, 2020

(54) SYSTEM AND METHOD FOR TRANSACTION SECURITY ENHANCEMENT

(71) Applicant: PayPal, Inc., San Jose, CA (US)

(72) Inventors: Sebastien Ludovic Jean Taveau, Redwood City, CA (US); Hadi Nahari, Mountain View, CA (US)

(73) Assignee: PAYPAL, INC., San Jose, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/103,532

(22) Filed: Aug. 14, 2018

(65) Prior Publication Data

US 2019/0130393 A1    May 2, 2019

Related U.S. Application Data

(63) Continuation of application No. 15/072,456, filed on Mar. 17, 2016, now Pat. No. 10,050,975, which is a
(Continued)

(51) Int. Cl.
*H04L 29/06* (2006.01)
*G06Q 20/38* (2012.01)
(Continued)

(52) U.S. Cl.
CPC ........... *G06Q 20/382* (2013.01); *G06F 21/44* (2013.01); *G06F 21/57* (2013.01); *G06F 21/74* (2013.01);
(Continued)

(58) Field of Classification Search
CPC ............. G06Q 20/382; G06Q 20/3223; G06Q 20/325; G06Q 20/357; G06Q 20/4014;
(Continued)

(56) References Cited

U.S. PATENT DOCUMENTS 6,023,764 A  *  2/2000 Curtis ................... G06F 21/606
                                                    726/5
6,895,501 B1 * 5/2005 Salowey ............... H04L 63/126
                                                    713/168
(Continued)

FOREIGN PATENT DOCUMENTS

EP            1457936 A2    9/2004
WO     WO 2007074431 A2    7/2007

OTHER PUBLICATIONS

Examination Report for Australian Application No. 20122250973, dated May 5, 2016, 3 pgs.
(Continued)

*Primary Examiner* — Michael S McNally
(74) *Attorney, Agent, or Firm* — Haynes and Boone, LLP (57) ABSTRACT

Various embodiments include a first detection being made that a first program residing on a device is requesting authentication. The first program resides in a first portion of the device. An authentication step can be performed by referencing a unique identifier accessible via a request sent by the first program to a second program residing on the device, where the second program resides in a second portion of the mobile device. The second portion has a greater level of security than the first portion (e.g. physical separation may exist between the first and second portions). Accordingly, integrity of the first program can be verified (e.g. an authentic, authorized version of a program is making a transaction request rather than an unauthorized version).

20 Claims, 5 Drawing Sheets

Related U.S. Application Data continuation of application No. 14/557,499, filed on Dec. 2, 2014, now Pat. No. 9,311,641, which is a continuation of application No. 13/441,363, filed on Apr. 6, 2012, now Pat. No. 8,914,876.

(60) Provisional application No. 61/482,927, filed on May 5, 2011.

(51) Int. Cl.

| | |
|---|---|
| *G06Q 20/40* | (2012.01) |
| *G06Q 20/32* | (2012.01) |
| *G06Q 30/06* | (2012.01) |
| *G06Q 20/34* | (2012.01) |
| *G06F 21/74* | (2013.01) |
| *G06F 21/57* | (2013.01) |
| *G06F 21/44* | (2013.01) |

(52) U.S. Cl.
CPC ....... *G06Q 20/3223* (2013.01); *G06Q 20/356* (2013.01); *G06Q 20/3576* (2013.01); *G06Q 20/4014* (2013.01); *G06Q 30/06* (2013.01); *H04L 63/06* (2013.01); *H04L 63/08* (2013.01); *H04L 63/105* (2013.01)

(58) Field of Classification Search
CPC ......... G06Q 30/06; G06F 21/44; G06F 21/57; G06F 21/74; H04L 63/06; H04L 63/08; H04L 63/105
USPC .......................................................... 726/19
See application file for complete search history.

(56) References Cited

U.S. PATENT DOCUMENTS

| | | | |
|---|---|---|---|
| 7,529,916 | B2 | 5/2009 | Kershaw et al. |
| 7,774,423 | B2 | 8/2010 | Suzuki et al. |
| 7,836,320 | B2 | 11/2010 | Harris |
| 7,849,310 | B2 * | 12/2010 | Watt ....................... G06F 9/3012 713/150 |
| 7,904,949 | B2 * | 3/2011 | Bowers ............... H04L 63/0884 380/255 |
| 8,045,958 | B2 | 10/2011 | Kahandaliyanage |
| 8,079,082 | B2 | 12/2011 | Patel |
| 8,332,610 | B2 | 12/2012 | Guthery |
| 8,533,803 | B2 | 9/2013 | Cha et al. |
| 8,549,275 | B2 | 10/2013 | Mittal |
| 2004/0123152 | A1 * | 6/2004 | Le Saint .................. G06F 21/52 726/9 |
| 2004/0153672 | A1 | 8/2004 | Watt et al. |
| 2006/0177068 | A1 | 8/2006 | Hatakeyama |
| 2007/0234042 | A1 | 10/2007 | Gantman et al. |
| 2009/0212909 | A1 | 8/2009 | Burger et al. |
| 2009/0328207 | A1 | 12/2009 | Patel |
| 2012/0149302 | A1 * | 6/2012 | Sekiya ............... G06Q 20/3278 455/41.1 |

OTHER PUBLICATIONS

International Search Report and Written Opinion for International Application No. PCT/US2012/035789, dated Jul. 6, 2012, 14 pgs.
Europan Patent Office, Communication Pursuant to Article 94(3) EPC, dated Mar. 30, 2020, 5 pages, for European Patent Application No. 16196296.4, Munich Germany.

* cited by examiner

SYSTEM AND METHOD FOR TRANSACTION SECURITY ENHANCEMENT

CLAIM OF PRIORITY

The present application is a continuation of U.S. application Ser. No. 15/072,456, filed Mar. 17, 2016, now U.S. Pat. No. 10,050,975, which is a continuation of U.S. application Ser. No. 14/557,499, filed on Dec. 2, 2014, now U.S. Pat. No. 9,311,641, which is a continuation application of U.S. patent application Ser. No. 13/441,363, filed on Apr. 6, 2012, now U.S. Pat. No. 8,914,876, which claims priority to U.S. Provisional Patent Application No. 61/482,927, filed on May 5, 2011, the contents of each are herein incorporated by reference in their entirety.

BACKGROUND

The present disclosure generally relates to managing payments online and, more particularly, to payment security.

Online transactions are becoming more and more prevalent, with an ever-increasing number of online entities that may or may not have a physical real world counterpart. Furthermore, the services offered by these online entities have been improving as well. The popularity of online transactions is partially attributable to the ease and convenience of making a transaction online instead of at a physical location. However, payment security is a big concern in online payment systems and methods. What is needed is a secure payment platform and technology that can sufficiently address user concerns with respect to transactional security.

SUMMARY

One of the broader forms of the present disclosure involves a system. The system includes: a computer memory storage component configured to store computer programming instructions; and a computer processor component operatively coupled to the computer memory storage component, wherein the computer processor component is configured to run a secure operating system and a non-secure operating system in parallel, wherein the secure and non-secure operating systems are isolated from each other, and wherein the computer processor component is configured to execute code to perform the following operations: receiving an authentication request from an application that is run by the non-secure operating system, wherein the authentication request contains credentials of the application; communicating with a secure applet that is run by the secure operating system, and wherein the communicating includes transferring the credentials of the application to the secure applet; and authenticating and vetting the application based on the credentials of the application.

Another one of the broader forms of the present disclosure involves an apparatus comprising a non-transitory, tangible machine-readable storage medium storing a computer program, wherein the computer program contains machine-readable instructions that when executed electronically by processors, perform: receiving an authentication request from an application that resides in a non-secure portion of an electronic chip, wherein the authentication request contains credentials of the application; communicating with a secure applet that resides in a secure portion of the electronic chip, wherein the secure portion is segregated from the non-secure portion, and wherein the communicating includes transferring the credentials of the application to the secure applet; and authenticating and vetting the application based on the credentials of the application.

Yet another one of the broader forms of the present disclosure involves a method of performing authentication and vetting. The method includes: receiving an authentication request from an application that resides in a non-secure portion of an electronic chip, wherein the authentication request contains credentials of the application; communicating with a secure applet that resides in a secure portion of the electronic chip, wherein the secure portion is segregated from the non-secure portion, and wherein the communicating includes transferring the credentials of the application to the secure applet; and authenticating and vetting the application based on the credentials of the application.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

As mobile computing and communication technologies continue to advance, transactions involving mobile devices are becoming increasingly more prevalent. The popularity of making transactions through mobile devices is partially attributable to the ease and convenience of these transactions (for example an online purchase) instead of traditional transactions involving tangible funding instruments (for example actual money or checks) at a physical location. However, as mobile transactions gain popularity, attacks targeting these transactions are also on the rise. These attacks may involve attempts of trying to steal the user's identity or financial information, or may involve malevolent entities trying to pose as legitimate merchants.

The present disclosure discloses methods and systems of that enhance the security of the mobile transactions, so that the attacks discussed above are substantially prevented or reduced.

Figure 1:
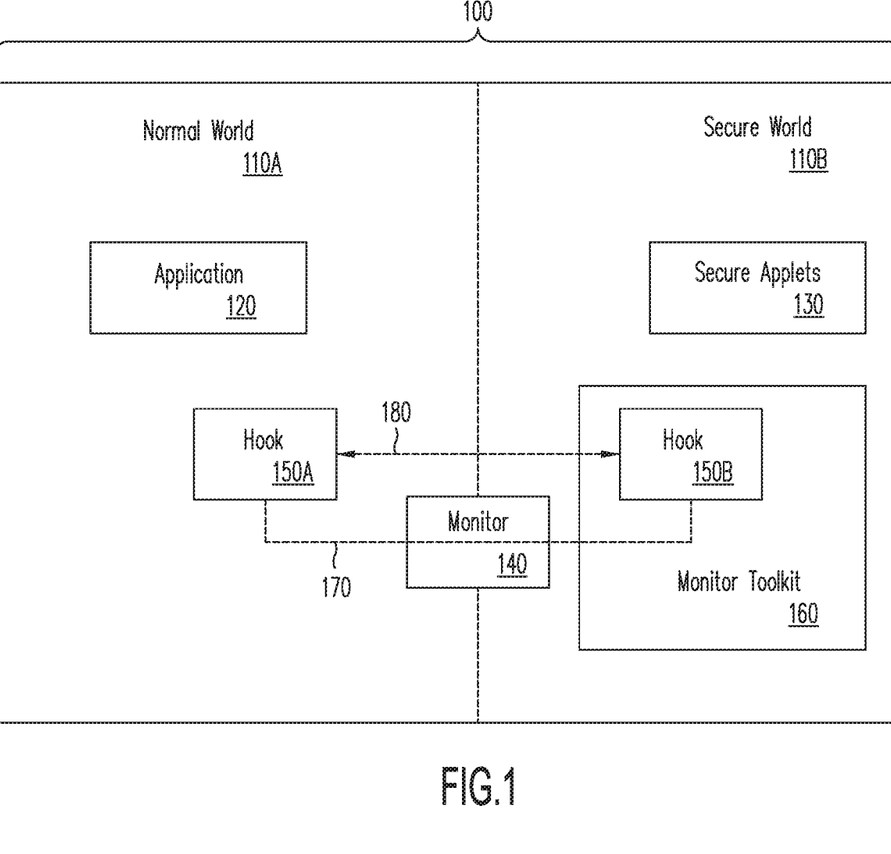
FIG. 1 illustrates a simplified block diagram of an electronic chip according to various aspects of the present disclosure.

Referring to FIG. 1, a simplified block diagram of an electronic chip 100 is illustrated. The electronic chip 100 may be implemented on a mobile device such as a mobile telephone handset, a computer tablet, a laptop, or the like. In some embodiments, the electronic chip 100 includes a computer processor, for example an Advanced RISC Machine (ARM®) processor. The computer process unit may contain memory storage capable of storing computer instructions. In other embodiments, the electronic chip 100 includes a computer memory storage device, for example, Read-Only Memory (ROM), FLASH, Random Access Memory (RAM), hard disk, optical disk, magnetic disk, or other suitable types of volatile and non-volatile memory devices.

The electronic chip 100 is a TrustZone®-enabled chip. TrustZone® is a technology developed by the ARM Holdings® company and offers a platform that supports a trusted environment where applications can be executed securely. In more detail, the electronic chip 100 includes a "normal world" 110A and a "secure world" 110B that are segregated from each other to prevent secure information from leaking from the secure world 110B to the normal world 110A. These two worlds 110A and 110B run parallel to each other on the same electronic chip 100. The secure world 110B is preloaded and validated prior to boot up time of a main operating system of the handset. In some embodiments, the normal world 110A runs the main operating system of the handset, while the secure world 110B runs a different (and more secure) operating system. Thus, the secure world 110B can be used to verify the integrity of components or applications residing in the normal world 110A. In some embodiments, such integrity verification may be accomplished by applying a set of control parameters against the last known or authorization configuration.

The normal world 110A and the secure world 110B may each contain one or more software applications. In some embodiments, the software applications residing in the secure world 110B may also be referred to as applets. For example, an application 120 resides in the normal world, and one or more secure applets 130 resides in the secure world. In some embodiments, the application 120 includes a part of a computer software program developed by a payment provider entity as such PAYPAL, INC®. of San Jose, Calif. or another suitable financial institution capable of transferring funds to and from a user's account. The application may be offered and downloaded by a user through the Internet, for example through GOOGLE PLAY® or the APPLE APP STORE®. The application 120 may include functionalities and interfaces that help perform standard tasks that require low levels of security. For example, the application 120 may contain programming instructions that allow a user of the payment provider entity to perform standard management tasks with his account, such as retrieving his purchasing history. In some other embodiments, the application 120 may be a part of a computer software program developed by a third party developer, for example a merchant that offers sale of tangible or digital goods. In that case, the application 120 from the third party developer can also be downloaded through GOOGLE PLAY® or the APPLE APP STORE®.

The secure applets 130 residing in the secure world 110B are program modules that are configured to perform secure tasks. In some embodiments, the secure applets 130 are another part of the computer software program developed by the payment provider entity. In other words, in that scenario, the secure applets 130 residing in the secure world 110B and the application 120 residing in the normal world 110A are two parts of a single downloadable application.

As the application 120 resides in the normal world 110A having lower levels of security, the application 120 may request authentication or vetting services from the secure applets 130 when tasks requiring high levels of security need to be performed. These secure tasks may include, but are not limited to, credential entry, secure identification entry, secure user interface, key access, or encryption/decryption services. Since the normal world 110A and the secure world 110B are segregated, a software module known as a monitor 140 may be used to carry out communication between the normal world 110A and the secure world 110B. In some embodiments, the monitor 140 is the sole means of communication between the normal world 110A and the secure world 110B. For example, the monitor 140 may interface with the application 120 without letting the application 120 gain access to any entities in the secure world 110B. The monitor 140 may then relay the request from the application 120 to a target entity in the secure world 110B, such as the secure applets 130. The monitor 140 then gives feedback to the application 120, sometimes along with a request resource such as a verification key or token.

In the embodiment illustrated, however, the monitor 140 is largely (or at least partially) bypassed. Instead, a "hook" 150A residing in the normal world 110A and a "hook" 150B residing in the secure world 110B may be used to carry out the communication between the normal world 110A and the secure world 110B instead. The hooks 150A and 150B may be a software module or a logical function that runs on top of the monitor 140. Whereas the monitor 140 functions like a gateway between the two worlds 110A-110B and performs switching at an operating system level, the hooks 150A-150B function as a "door-stop" that effectively "props open" the gateway between the two worlds 110A-110B and performs switching at an application level. In some embodiments, the hooks 150A-150B "prop open" the gateway for a single application. In other words, when in use by one application, another application not signed or recognized by the hooks 150A-150B cannot dump the original application from the priority list. Each hook can reside in its own space or within the application or applet in its respective world.

The hook 150B residing in the secure world 110B is implemented by the resources of a monitor toolkit 160. The monitor toolkit 160 contains a full set of monitor functions. For a first time provisioning and activation, the hook 150A and the hook 150B may still go through the monitor 140, which is indicated by a pathway 170. Thereafter, direct communication may be established between the hook 150A and the hook 150B, which is indicated by a pathway 180. Therefore, entities residing in the normal world 110A such as the application 120 may communicate with the trusted entities residing in the secure world 110B such as the secure applets through the hooks 150A-150B, while bypassing the monitor 140.

The system described in FIG. 1 can be used to enhance security in mobile device transactions. For example, if an application requesting authentication cannot seek verification by a remote secure entity, which may be due to loss of network connections or other reasons, then the secure applets 130 in the secure world may be used to authenticate or vet the application. This is possible because the secure applets 130 (and other entities) are already validated as being secure since they reside in the secure world 110B, even if that secure world 110 is local to a mobile device itself. In this sense, the secure world 110B of the electronic chip 100 is leveraged to perform tasks involving enhanced security.

For example, a payment provider entity could provide to its partners a developer kit that would allow them to develop applications for various platforms with the security validation being done by the payment provider entity in the same way from the secure world. By providing the developer with a way to make sure its application is legit, it will not only reassure the end-user of the integrity of the transaction but also limit the risk for the developer to see a fraudulent transaction to go through. This can be done by creating a subset of functions from the mobile library of the payment provider entity to be leveraged to sign an application from a third party developer. The third party may take proper advantage of an application programming interface (API) from the payment provider and may provide its own user anti-spoofing/anti-phishing experience.

At least two use cases apply. In an "In App Payment" use case, the payment provider may provide its library to a third party developer, such as a merchant. The application (for example the application 120) developed by the third party developer may contain the library from the payment provider, which embeds a string of code in its library that will be understood only by the secure world module (for example the secure applets 130 residing in the secure world 110B) of the payment provider. If a spoof application is trying to mimic the legitimate application from a third party developer, it will fail at the launch of the payment module In an "In Flow Payment" user case, an application from a third party developer is in a stand alone mode, as well as the application from the third party payment provider. There is a handover from one application to the other at the time of payment. A validation mechanism may be stored in the secure world 110B that would validate a call of that third party application to the payment provider application.

As an example to illustrate the above use cases, suppose a merchant "Big Mart" develops a shopping application that is downloadable to a user's mobile device. "Big Mart" may be one of the partners of the payment provider entity. Thus, the payment provider entity may offer its library to "Big Mart." The library has an embedded security mechanism, such as a key that can be matched to a counterpart key. In fact, the payment provider may assign a chain of different keys to a plurality of its partner developers. The payment provider keeps track of which key is assigned to which developer and may maintain that information in its downloadable application.

A user of the payment provider downloads the application from the payment provider as well as the application from "Big Mart" on his mobile device. The user may make an online purchase using the application from "Big Mart." At this time, the "Big Mart" application may ask the user for sensitive information such as his name, address, and/or credit card information. In traditional payment scenarios, the user may not know that the application from "Big Mart" is legitimate or can be trusted. Here, the "Big Mart" application can be authenticated and vetted by the secure applets residing on the secure world of the user's mobile device. In some embodiments, authentication may refer to the process of validating the legitimacy and/or the security of a particular application for itself, and vetting may refer to the process of validating the legitimacy and/or the security of a particular application to others. In other words, the vetting of a particular application means it can be trusted by everyone else. Returning to the example, the authentication and/or vetting of the "Big Mart" application may be performed by the secure applets of the payment provider residing in the secure world. Specifically, the "Big Mart" application submits its authentication or vetting credentials to the secure applets through the hooks. The authentication or vetting credentials may include the key given to the "Big Mart" application by the payment provider entity. The secure applets retrieve the key and tries to pairs it with a corresponding key stored within the secure world. If the key pairing is successful, then that means the "Big Mart" application is legitimate and can be trusted, thus the "Big Mart" application is authenticated and vetted. If the key pairing is unsuccessful, then that indicates the "Big Mart" application may be a fake one, and it will not be authenticated or vetted.

In some embodiments, the authentication or vetting of the "Big Mart" application may be communicated to the user by a visual and/or audio representation on the mobile device. For example, the display screen of the mobile device may display a certain pattern to let the user known that the "Big Mart" application has been authenticated and vetted, and that the user may go ahead and provide the sensitive information to the "Big Mart" application without concerns of theft or data loss.

Figure 2:
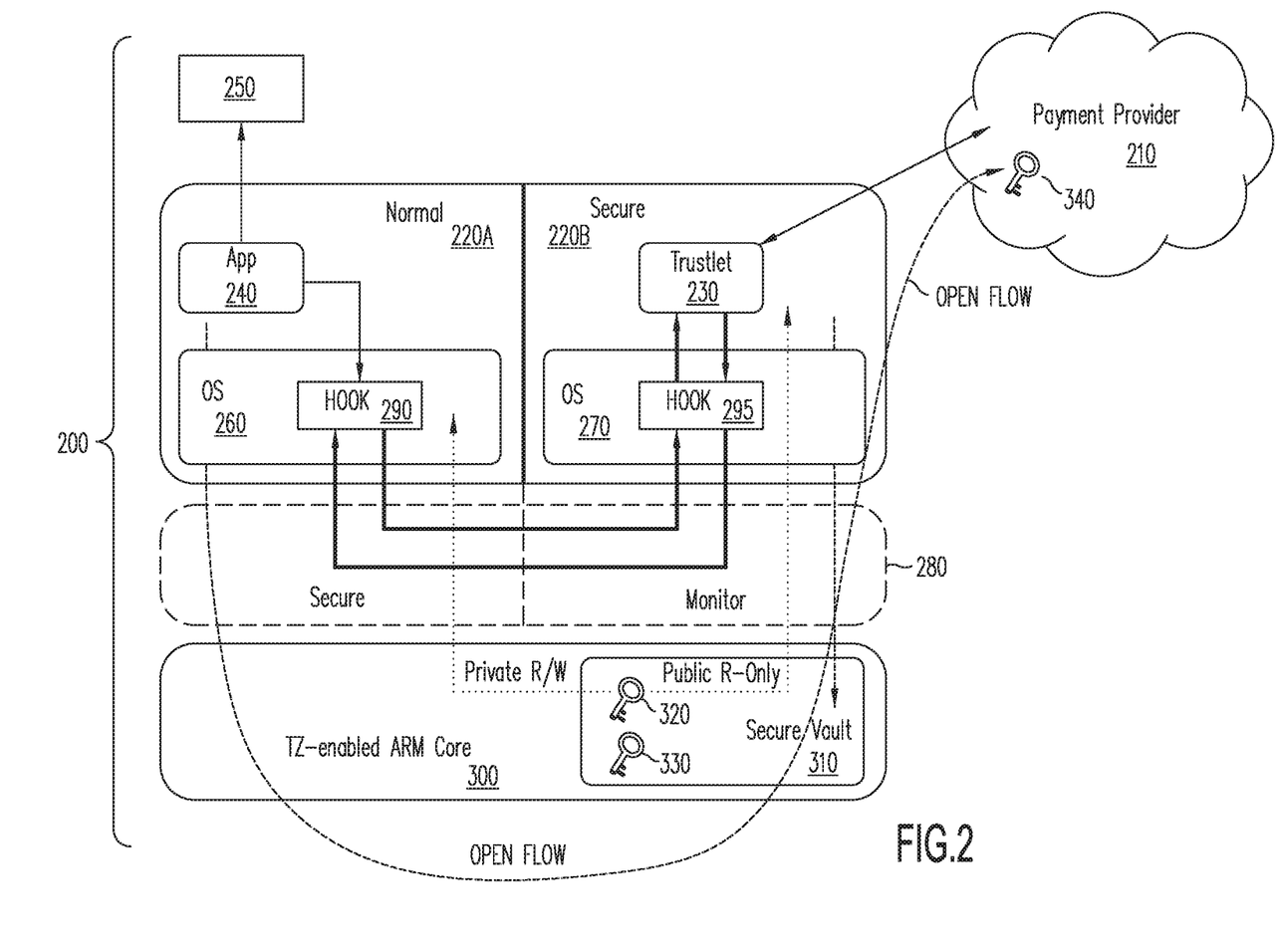
FIG. 2 illustrates a high level architecture for performing authentication and vetting according to various aspects of the present disclosure

FIG. 2 is a simplified high level architecture 200 that illustrates the various aspects of the present disclosure. The architecture 200 includes a payment provider 210. The payment provider may be an entity as such PAYPAL, INC®. of San Jose, Calif. or another suitable financial institution capable of transferring funds to and from a user's account. The payment provider 210 has servers located remotely in a "cloud" and is configured to perform services such as mutual authentication enablement, post/pre-provisioning, remote enablement, over the air (OTA) services, or the like.

The architecture 200 also includes a normal world 220A and a secure world 220B that run parallel to, but are isolated from, each other. A trustlet (a secure applet) 230 resides in the secure world 220B. The trustlet 230 may be an application trusted by the payment provider 210 (for example, the trustlet 230 may be an application developed by the payment provider 210). The trustlet 230 can directly communicate with the payment provider 210. An app 240 (which may include one or more applications) resides in the secure world 220A. The app 240 communicates with external entities 250 that need secure operations to be performed, thus requiring a switch to the secure world 220B. These secure operations may include credentials entry, secure ID, secure user interface, key access, or encryption/decryption services.

A normal operating system 260 runs the normal world 220A, and a secure operating system 270 runs the secure world. A secure monitor 280 serves as a default gateway between the normal world 220A and the secure world 220B. However, the operating system 260 is implemented to be capable of controlling and maintaining a "hook" 290 therein, and the operating system 270 is implemented to be capable of controlling and maintaining a "hook" 295, where the hooks 290-295 can be used to establish communication with the secure world 220B. In addition, the normal operating system 260 and the secure operating system 270 are implemented to be capable of using the same hooks 290-295 to talk back to applications from trusted application (e.g., the trustlet 230) residing in the secure world 220B and establish trust/vetting for applications (e.g., app 240) residing in the normal world 220A. Thus, an open flow exists between the normal world 220A and the payment provider 210. Stated differently, the communication is not blocked by the monitor 280, and applets and applications can be managed from the "cloud"—i.e., the remote servers of the payment provider 210.

A TrustZone®-enabled ARM® core processor 300 is used to execute instructions for the normal operating system 260 and the secure operating system 270. The TrustZone®-enabled ARM® core processor 300 contains a secure vault 310. Private keys 320 and public keys 330 can both be stored in the secure vault 310. Meanwhile, a private key 340 can be stored remotely in the servers of the payment provider 210 as well. These private and public keys may be used to perform authentication and/or vetting tasks, for example for the app 240.

It is understood that the high level architecture 200 described above is merely one of many example implementations of the concepts of the present disclosure. Other embodiments may have different implementation details without departing from the spirit and the scope of the present disclosure.

Figure 3:
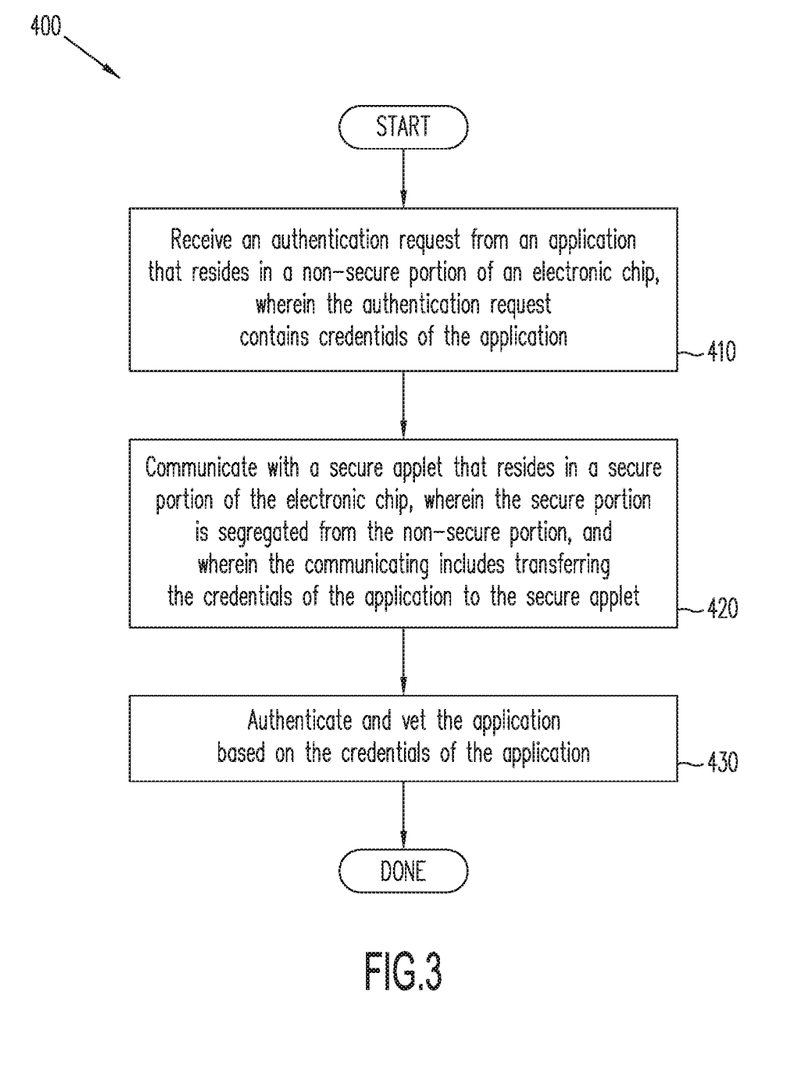
FIG. 3 illustrates a method for performing authentication and vetting according to various aspects of the present disclosure

FIG. 3 is a flowchart of a method 400 of performing authentication and vetting tasks according to the various aspects of the present disclosure. The method 400 includes a step 410, in which an authentication request is received from an application that resides in a non-secure portion of an electronic chip. In some embodiments, the electronic chip includes a computer memory on a mobile electronic device. In other embodiments, the electronic chip includes a computer processor on a mobile electronic device. The authentication request contains credentials of the application. In some embodiments, the credentials include an authentication instrument assigned to a developer of the application. For example, the authentication instrument may include a key.

The method 400 includes a step 420, in which communication is performed with a secure applet that resides in a secure portion of the electronic chip. The secure portion is segregated from the non-secure portion. The communication includes transferring the credentials of the application to the secure applet. In some embodiments, the application is a software program from a third party developer, and the secure applets are a portion of a software program from a payment provider. In other embodiments, the application and the secure applets are both portions of a software program from a payment provider. The communication is also performed at least in part by at least partially bypassing a monitor that is configured as a gateway between the secure portion of the electronic chip and the non-secure portion of the electronic chip.

The method 400 includes a step 430, in which the application is authenticated and vetted based on the credentials of the application. In certain embodiments, the authenticating and the vetting are performed without accessing a remote server.

It is understood that additional method steps may be performed before, during, or after the steps 410-430 discussed above. For the sake of simplicity, however, these additional steps are not specifically illustrated or discussed herein.

Figure 4:
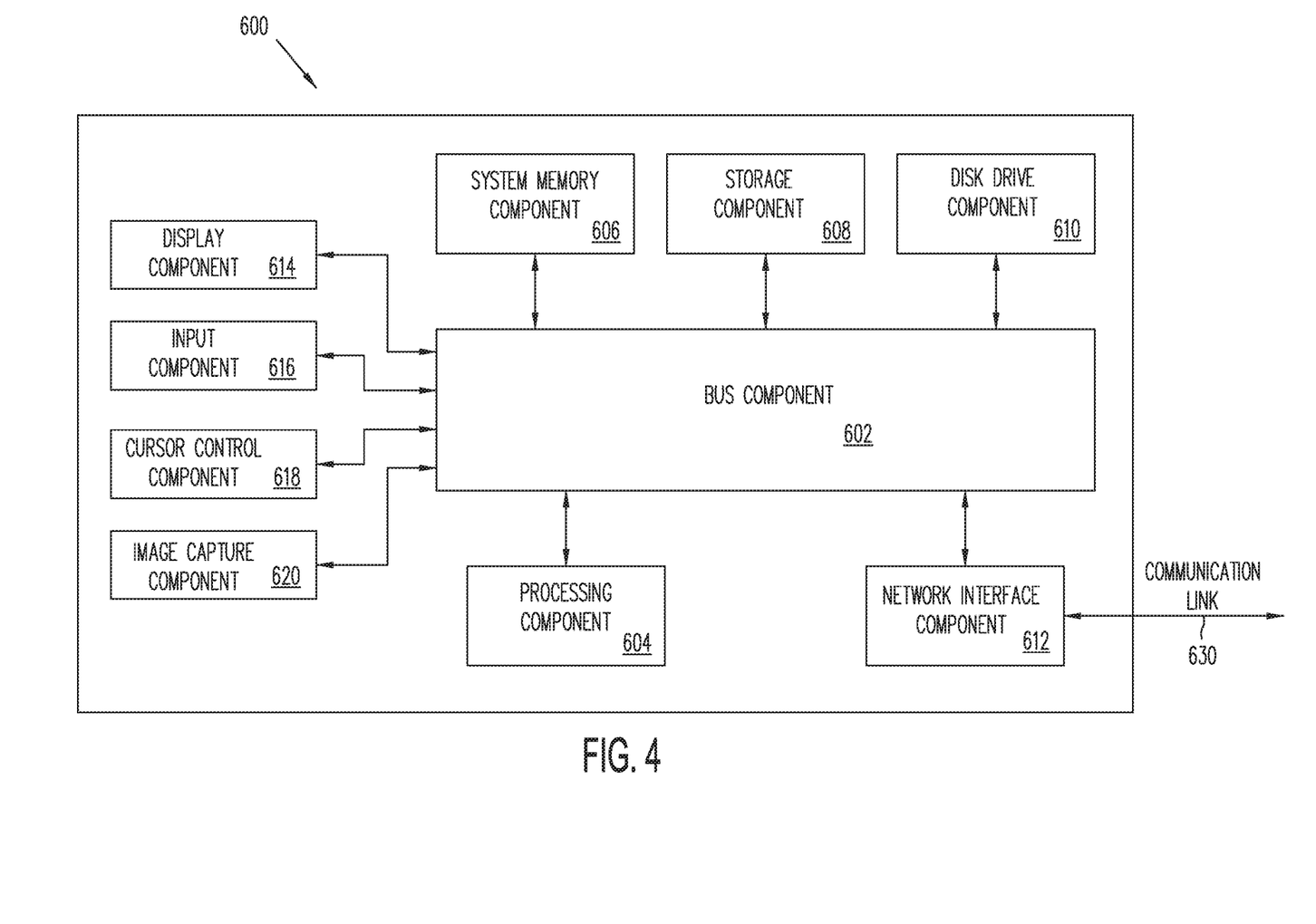
FIG. 4 illustrates a computer for implementing the various steps of the method of FIG. 3 according to various aspects of the present disclosure
Figure 5:
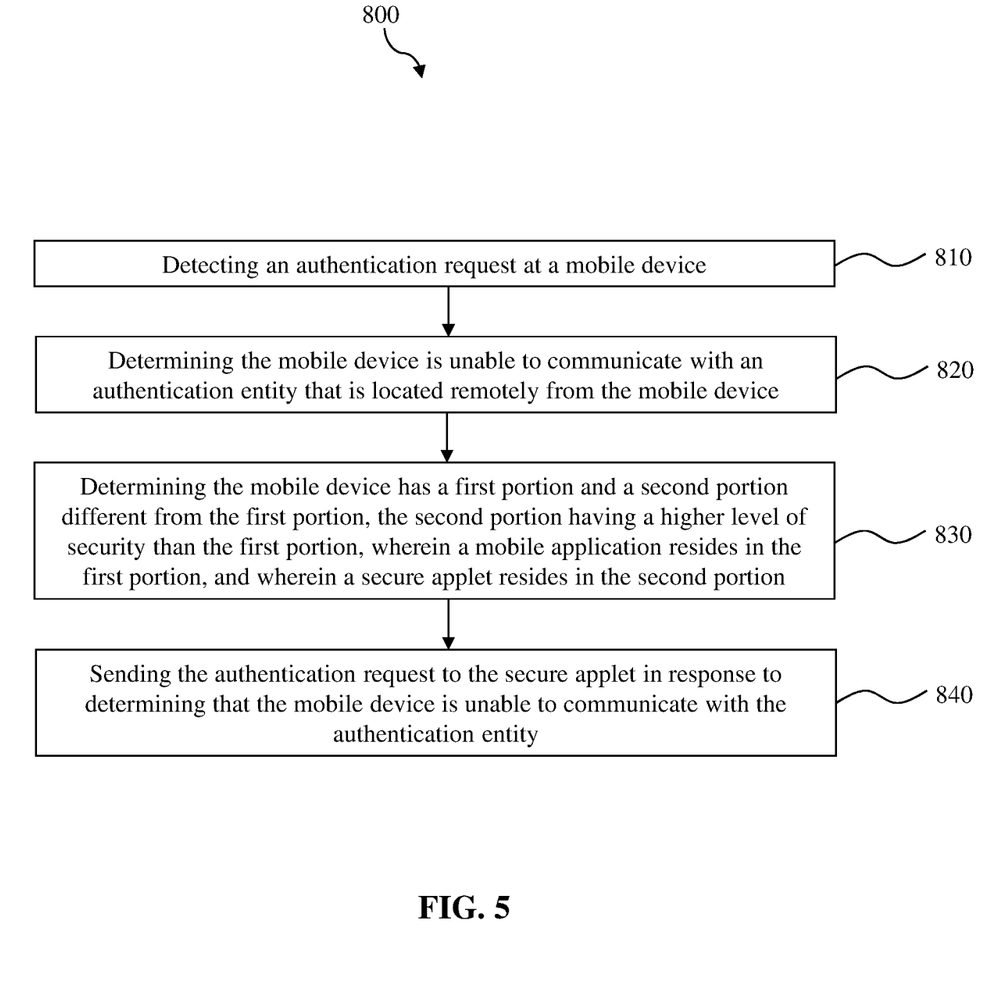

FIG. 4 is a block diagram of a computer system 600 suitable for implementing various methods and devices described herein, for example, the various method steps of the method 400. In various implementations, the devices capable of performing the steps may comprise a network communications device (e.g., mobile cellular phone, laptop, personal computer, tablet, etc.), a network computing device (e.g., a network server, a TrustZone®-enabled computer processor, an electronic communications interface, etc), or another suitable device. Accordingly, it should be appreciated that the devices capable of implementing the method 400 may be implemented as the computer system 600 in a manner as follows.

In accordance with various embodiments of the present disclosure, the computer system 600, such as a network server or a mobile communications device, includes a bus component 602 or other communication mechanisms for communicating information, which interconnects subsystems and components, such as a TrustZone®-enabled processing component 604 (e.g., processor, micro-controller, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., cathode ray tube (CRT) or liquid crystal display (LCD)), input component 616 (e.g., keyboard), cursor control component 618 (e.g., mouse or trackball), and image capture component 620 (e.g., analog or digital camera). In one implementation, disk drive component 610 may comprise a database having one or more disk drive components.

In accordance with embodiments of the present disclosure, computer system 600 performs specific operations by the TrustZone®-enabled processor 604 executing one or more sequences of one or more instructions contained in system memory component 606. Such instructions may be read into system memory component 606 from another computer readable medium, such as static storage component 608 or disk drive component 610. In other embodiments, hard-wired circuitry may be used in place of (or in combination with) software instructions to implement the present disclosure.

Logic may be encoded in a computer readable medium, which may refer to any medium that participates in providing instructions to TrustZone®-enabled processor 604 for execution. Such a medium may take many forms, including but not limited to, non-volatile media and volatile media. In one embodiment, the computer readable medium is non-transitory. In various implementations, non-volatile media includes optical or magnetic disks, such as disk drive component 610, and volatile media includes dynamic memory, such as system memory component 606. In one aspect, data and information related to execution instructions may be transmitted to computer system 600 via a transmission media, such as in the form of acoustic or light waves, including those generated during radio wave and infrared data communications. In various implementations, transmission media may include coaxial cables, copper wire, and fiber optics, including wires that comprise bus 602.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 630 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 600 may transmit and receive messages, data, information and instructions, including one or more programs (i.e., application code) through communication link 630 and communication interface 612. Received program code may be executed by TrustZone®-enabled processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   an electronic chip that includes a secured hardware environment configured to execute computer instructions separately from an unsecured hardware environment of the system; and
   a non-transitory storage medium having stored thereon a first program comprising first computer instructions, wherein the first program is executable within the secured hardware environment to cause the system to perform operations comprising:
      receiving, from a second program executing within the unsecured hardware environment, an authentication request to verify the second program;
      determining a unique identifier corresponding to the authentication request; based on the unique identifier, attempting to locate matching data for the unique identifier within the secured hardware environment; and
      determining an integrity status of the second program based on whether the matching data was successfully located.

2. The system of claim 1, wherein the electronic chip includes a secured portion corresponding to the secured hardware environment and includes an unsecured portion that is separate from the secured portion, wherein the unsecured portion corresponds to the unsecured hardware environment.

3. The system of claim 1, wherein the non-transitory storage medium comprises a first storage medium within the secured hardware environment.

4. The system of claim 1, wherein the authentication request is received from the second program via an application programming interface (API) having specific function calls corresponding to the secured hardware environment.

5. The system of claim 1, wherein the system comprises a mobile phone device.

6. The system of claim 1, wherein the operations further comprise providing an indication of the integrity status following determining the integrity status.

7. A method, comprising:
   at a first program executing within a secured hardware environment of a computing device, receiving an authentication request to verify a second program that is executing within an unsecured hardware environment of the computing device;
   determining, from the authentication request and within the secured hardware environment, a unique identifier corresponding to the second program;
   based on the unique identifier, attempting to locate matching data for the unique identifier within the secured hardware environment;
   determining an integrity status of the second program based on whether the matching data was successfully located; and
   providing, by the secured hardware environment, an indication of the integrity status of the second program.

8. The method of claim 7, further comprising:
   preventing the second program from completing a transaction based on the integrity status indicating that the second program is not authorized to perform the transaction.

9. The method of claim 8, wherein the transaction comprises an electronic transfer of funds from a transmitter to a receiver.

10. The method of claim 7, wherein the second program is a software program installed from an online store having a plurality of unrelated applications available for download.

11. The method of claim 7, wherein the authentication request from the second program is made in association with an encryption or a decryption operation.

12. The method of claim 7, wherein determining the unique identifier from the authentication request comprises extracting a string of code from the authentication request, the string of code having been provided to a developer of the second program by a developer of the first program.

13. The method of claim 7, wherein a plurality of unique software keys are stored within the secured hardware environment, wherein each of the plurality of unique software keys are usable within the secured hardware environment to determine an integrity status of a corresponding plurality of software programs that are executable within the unsecured hardware environment.

14. The method of claim 7, wherein exclusive access between the secured hardware environment and the unsecured hardware environment is provided by a secure monitor configured to be executed by the computing device.

15. The method of claim 7, wherein the computing device includes an electronic chip having a secured portion corresponding to the secured hardware environment and having an unsecured portion that is separate from the secured portion, wherein the unsecured portion corresponds to the unsecured hardware environment.

16. A non-transitory computer-readable medium having stored thereon instructions that are executable by a secure processing element of a computer system, the secure processing element corresponding to a secured environment of the computer system that is separate from an unsecured environment of the computer system, to cause the secure processing element to perform operations comprising:

receiving an authentication request to verify a second program that is located within the unsecured environment of the computer system;

determining, from the authentication request and within the secured environment, a unique identifier corresponding to the second program;

based on the unique identifier, attempting to locate matching data for the unique identifier within the secured environment;

determining an integrity status of the second program based on whether the matching data was successfully located; and providing an indication of the integrity status of the second program.

17. The non-transitory computer-readable medium of claim 16, wherein the authentication request from the second program is made in association with a payment request operation.

18. The non-transitory computer-readable medium of claim 16, wherein the secure processing element comprises a first program that is different from the second program, wherein determining the unique identifier from the authentication request comprises extracting a string of code from the authentication request, the string of code having been provided to a developer of the second program by a developer of the first program.

19. The non-transitory computer-readable medium of claim 16, wherein a plurality of unique software keys are stored within the secured environment, wherein each of the plurality of unique software keys are usable within the secured environment to determine an integrity status of a corresponding plurality of software programs that are executable within the unsecured environment.

20. The non-transitory computer-readable medium of claim 16, wherein the authentication request is received from the second program via an application programming interface (API) having specific function calls corresponding to the secured environment.

* * * * *